(12) United States Patent  
Tsubota

(10) Patent No.: US 7,675,708 B2  
(45) Date of Patent: Mar. 9, 2010

(54) SUBSTRATE FOR THIN-FILM MAGNETIC HEAD

(75) Inventor: Hironobu Tsubota, Kyoto (JP)

(73) Assignee: Hitachi Metals, Ltd., Tokyo (JP)

( * ) Notice: Subject to any disclaimer, the term of this patent is extended or adjusted under 35 U.S.C. 154(b) by 636 days.

(21) Appl. No.: 10/885,313

(22) Filed: Jul. 7, 2004

(65) Prior Publication Data

US 2005/0024772 A1  Feb. 3, 2005

(30) Foreign Application Priority Data

Jul. 28, 2003  (JP) .............................. 2003-280675  
Mar. 29, 2004 (JP) .............................. 2004-096323

(51) Int. Cl.  
*G11B 5/147* (2006.01)

(52) U.S. Cl. ............................................... 360/125.39

(58) Field of Classification Search ................ 360/125, 360/126, 125.38, 125.39  
See application file for complete search history.

(56) References Cited

U.S. PATENT DOCUMENTS

| | | | | |
|---|---|---|---|---|
| 3,799,796 A | * | 3/1974 | Hunter | 427/227 |
| 4,454,014 A | * | 6/1984 | Bischoff | 428/611 |
| 4,681,813 A | * | 7/1987 | Yamada et al. | 428/450 |
| 4,713,284 A | * | 12/1987 | Hasegawa et al. | 442/233 |
| 4,796,127 A | | 1/1989 | Wada et al. | |
| 4,814,915 A | | 3/1989 | Wada et al. | |
| 4,849,290 A | * | 7/1989 | Fujimori et al. | 428/408 |
| 4,902,651 A | * | 2/1990 | Wada et al. | 501/87 |
| 5,165,981 A | * | 11/1992 | Yamakawa et al. | 428/141 |
| 5,595,946 A | * | 1/1997 | Tsujimoto et al. | 501/87 |
| 5,595,947 A | * | 1/1997 | Tsujimoto et al. | 501/87 |
| 5,609,948 A | * | 3/1997 | David et al. | 428/216 |
| 5,645,898 A | * | 7/1997 | Sato et al. | 427/539 |
| 5,657,192 A | * | 8/1997 | Cohen et al. | 360/126 |
| 5,734,534 A | * | 3/1998 | Yamamoto et al. | 360/119.07 |
| 5,936,813 A | * | 8/1999 | Kim et al. | 360/320 |
| 6,034,847 A | * | 3/2000 | Komuro et al. | 360/126 |
| 6,198,607 B1 | * | 3/2001 | Cain et al. | 360/318.1 |
| 6,277,506 B1 | * | 8/2001 | Okamoto | 428/701 |
| 2001/0010612 A1 | * | 8/2001 | Koishi et al. | 360/236.3 |
| 2005/0264912 A1 | * | 12/2005 | Nikitin et al. | 360/75 |

FOREIGN PATENT DOCUMENTS

| | | | |
|---|---|---|---|
| JP | 60050905 A | * | 3/1985 |
| JP | 62084905 A | * | 4/1987 |
| JP | 11-283221 | | 10/1999 |
| JP | 11283221 A | * | 10/1999 |
| JP | 11-339229 | | 12/1999 |

* cited by examiner

*Primary Examiner*—Brian E Miller  
(74) *Attorney, Agent, or Firm*—Keating & Bennett, LLP

(57) ABSTRACT

A thin-film magnetic head substrate includes a ceramic base, an undercoat film of an aluminum oxide, and an intermediate layer, which is sandwiched between the ceramic base and the undercoat film and which is made of a material other than the aluminum oxide and an Al—Ti—O compound.

8 Claims, 4 Drawing Sheets

SUBSTRATE FOR THIN-FILM MAGNETIC HEAD

BACKGROUND OF THE INVENTION

1. Field of the Invention

The present invention relates to a substrate for use to make a thin-film magnetic head slider for a hard disk drive (which will be referred to herein as a "thin-film magnetic head substrate") and also relates to a method of manufacturing such a substrate.

2. Description of the Related Art

Thanks to recent tremendous development of information and telecommunication technologies, the amount of information that can be processed by computers has increased by leaps and bounds. In particular, audiovisual (or multimedia) information such as sounds, music and video, which used to be capable of being processed only as analog signals, now can be converted into digital signals and processed by personal computers. Multimedia data such as music and video contains a huge amount of information. Thus, it has become more and more necessary to further increase the capacity of storage media for use in personal computers, for example.

A hard disk drive is a typical information storage device that has been used broadly in personal computers, for example. To meet the demand described above, the capacity of hard disks needs to be further increased and the overall size of the drive needs to be reduced. Meanwhile, a hard disk recorder for writing video data on a hard disk directly and an audio player for writing musical data on a hard disk have become increasingly popular these days. In these recorders and players, the storage capacity also needs to be further increased and the overall size of the hard disk drive also needs to be decreased to make the recorder or player ready to carry about.

FIG. 7A is a cross-sectional view schematically illustrating a thin-film magnetic head slider and surrounding portions thereof in a conventional hard disk drive. As shown in FIG. 7A, an undercoat film 13 is provided on a side surface of a base 12, which is supported on a gimbal 10. A read head 16 is provided on the undercoat film 13 and a write head 14 is further provided adjacent to the read head 16. Such a unit, including the base 12, write head 14 and read head 16 to be supported on the gimbal 10, is normally called a "head slider" or simply "slider".

The write head 14 is made of a magnetic material and has a ring configuration, inside of which a coil 15 is wound. When a write signal is supplied to the coil 15, a magnetic field is generated in the write head 14, thereby writing data on a magnetic storage medium 17.

On the other hand, the read head 16 is a magneto-resistive (MR) or giant MR (GMR) element to convert a variation in magnetic field into a variation in electrical resistance. That is to say, the read head 16 senses a variation in the magnetic field recorded on the magnetic storage medium 17, thereby producing an electric signal representing the data that is stored on the magnetic storage medium 17.

The base 12 to hold the read head 16 and the write head 14 thereon has often been made of an $Al_2O_3$—TiC based ceramic sintered body. The $Al_2O_3$—TiC based ceramic material (which will be referred to herein as an "AlTiC material") has been used extensively because this material exhibits excellent thermal and mechanical properties and processability while striking an adequate balance between them. However, the AlTiC material is a good electrical conductor. Accordingly, if the write head 14 were disposed adjacent to such a conductor base 12, then the write head 14 would be short-circuited and could not operate properly. Also, the surface of such an AlTiC base has pores and is not sufficiently smooth. For that reason, to electrically insulate the write head 14 from the base 12 sufficiently and increase the smoothness of the surface of the base 12, the undercoat film 13 of $Al_2O_3$ is normally provided on the side surface of the base 12. This is because $Al_2O_3$ exhibits a good electrical insulation property and has a smooth enough surface.

The conventional slider, however, has various problems to overcome.

Firstly, as it has become more and more necessary to reduce the overall size of hard disk drives, sliders also must be further reduced in size. To reduce the size of sliders, the cross-sectional area of the coil 15 inside of the write head 14 should be reduced as shown in FIG. 7B. More specifically, the inside diameter of the coil 15 needs to be minimized and yet respective loops of the coil 15 should not overlap with each other. However, when a current flows through the coil 15 with such a reduced cross-sectional area by way of terminals 18, the quantity of heat generated per unit area increases.

However, $Al_2O_3$, which has often been used as a material for the undercoat film 13, does not have such good thermal conductivity. Accordingly, the heat, generated by supplying the coil 15 with current, is shut off by the $Al_2O_3$ undercoat film 13, and cannot diffuse toward the base 12 sufficiently. Thus, the heat is stored in the read head 16 or the write head 14. As a result, the read head 16 or the write head 14 thermally expands and protrudes toward the magnetic storage medium 17 as indicated by the arrow in FIG. 7A. The gap between the read head 16 or the write head 14 and the magnetic storage medium 17 is as small as about 10 nm. Thus, it is quite possible for the thermally expanded read head 16 or write head 14 to contact with the magnetic storage medium 17 accidentally.

This phenomenon is called a "thermal pole tip recession (TPTR)". When this phenomenon happens, the read head 16 or the write head 14 physically contacts with the magnetic storage medium, thereby scratching the magnetic storage medium or damaging the read head 16 or the write head 14 itself. Then, a serious failure might be caused, or the hard disk drive could not operate properly anymore.

Also, even if the read head 16 or the write head 14 can avoid contact with the magnetic storage medium 17, the gap between the read head 16 or the write head 14 and the magnetic storage medium 17 changes due to the thermal expansion of the read head 16 or the write head 14. For example, when the read head 16 or the write head 14 expands several nanometers, the gap between the magnetic storage medium 17 and the read head 16 or the write head 14 decreases 10% or more. Then, the read or write performance is affected significantly, and errors may be created in the signals to be written on, or read out from, the magnetic storage medium.

To overcome this problem, the undercoat film 13 may have a reduced thickness so that the heat can be dissipated into the base 12 more easily. In that case, however, static electricity might cause electrostatic breakdown or decrease the dielectric breakdown strength.

More specifically, static electricity is generated particularly easily in a hard disk drive because the rigid magnetic storage medium rotates at a high velocity. Accordingly, the static electricity is likely stored in the read head 16 and write head 14, which are provided on the undercoat film 13 made of $Al_2O_3$ with high electrical insulation property. In this case, if the undercoat film 13 is thin, then the static electricity stored is likely discharged into the base 12 that is adjacent to the undercoat film 13. As a result, dielectric breakdown occurs in the undercoat film 13 and the read and write heads 16 and 14 are damaged. Also, such a thin undercoat film 13 would have decreased electrical insulation property and allow an increased amount of leakage current to flow even if the undercoat film 13 caused no dielectric breakdown. Then, the read and write heads 16 and 14 do not operate properly any longer.

To overcome these problems, Japanese Laid-Open Publication No. 11-283221 discloses that a conventional undercoat film 13 is provided on a base 12 and an amorphous alumina film is deposited to a thickness of 100 nm to 55,000 nm on the undercoat film 13 by an ECR sputtering process. Japanese Laid-Open Publication No. 11-283221 insists that high dielectric breakdown strength is achieved by such a structure because the amorphous alumina film deposited by the ECR sputtering process has high density.

However, to obtain such a structure, an ECR sputtering system needs to be used. That is to say, two different types of systems need to be used to make the conventional undercoat film 13 and that amorphous alumina film, respectively, thus increasing the manufacturing cost of the substrate significantly.

SUMMARY OF THE INVENTION

In order to overcome the problems described above, preferred embodiments of the present invention provide a thin-film magnetic head substrate and a manufacturing method thereof that can be used effectively to significantly increase the reliability of a miniaturized, high-capacity hard disk drive by eliminating the TPTR phenomenon, read or write errors, and electrostatic or dielectric breakdown.

A thin-film magnetic head substrate according to a preferred embodiment of the present invention preferably includes: a ceramic base; an undercoat film of an aluminum oxide; and an intermediate layer, which is sandwiched between the ceramic base and the undercoat film and which is made of a material other than the aluminum oxide and an Al—Ti—O compound.

In one preferred embodiment, the intermediate layer preferably has a thickness of 1 nm to 1 μm.

In another preferred embodiment, the intermediate layer is preferably made of a metal or Si.

In still another preferred embodiment, the intermediate layer is preferably made of a material selected from the group consisting of Cu, Cr, Si, alloys including Cu, alloys including Cr, and compounds including Si.

In yet another preferred embodiment, the undercoat film preferably has a thickness of 10 nm to 0.4 μm.

In yet another preferred embodiment, the ceramic base is preferably made of an alumina-based ceramic material including 24 mol % to 75 mol % of α-$Al_2O_3$ and at most 2 mol % of an additive.

In this particular preferred embodiment, the ceramic base preferably further includes a carbide or nitride carbonate of a metal.

A thin-film magnetic head slider according to a preferred embodiment of the present invention preferably includes the thin-film magnetic head substrate according to any of the preferred embodiments of the present invention described above, and a read head and a write head, which are supported on the thin-film magnetic head substrate.

A hard disk drive according to a preferred embodiment of the present invention preferably includes the thin-film magnetic head slider described above.

A method of manufacturing a thin-film magnetic head substrate according to a preferred embodiment of the present invention preferably includes the steps of: forming an intermediate layer, which is made of a material other than an aluminum oxide and an Al—Ti—O compound, on a ceramic base by a sputtering process; and forming an undercoat film, made of the aluminum oxide, on the intermediate layer by a sputtering process.

In one preferred embodiment of the present invention, the step of forming the intermediate layer preferably includes the step of performing the sputtering process with no bias voltage applied.

In another preferred embodiment, the step of forming the undercoat film preferably includes the step of performing the sputtering process with a bias voltage applied.

In still another preferred embodiment, the step of forming the intermediate layer preferably includes the step of performing the sputtering process using a metal element as a target.

A method of manufacturing a thin-film magnetic head slider according to a preferred embodiment of the present invention preferably includes the steps of: preparing the thin-film magnetic head substrate, including the ceramic base, the intermediate layer, and the undercoat film, according to any of the preferred embodiments of the present invention described above; and forming a read head and a write head on the undercoat film.

According to various preferred embodiments of the present invention described above, an intermediate layer is preferably provided on a base, thereby flattening the surface of the base on which an undercoat film is deposited and preventing any portion of the aluminum oxide to be the undercoat film from turning into an electrically conductive compound. Accordingly, even an undercoat film with a reduced thickness can still exhibit excellent electrical insulation property, thereby providing a thin-film magnetic head substrate with good resistance to electrostatic breakdown, good thermal conductivity and good electrical insulation property.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

The present inventors carried out an extensive research on conventional thin-film magnetic head substrates. As a result, the present inventors discovered that as the thickness of the undercoat film of an aluminum oxide was going to be reduced, the actual electrical insulation property of the undercoat film was worse than what was expected from the reduced thickness. There are two imaginable reasons for this phenomenon.

In general, a ceramic substrate of AlTiC, for example, is a mixture of an electrical insulator and an electrical conductor. Thus, electrically insulating areas and electrically conductive areas are present on the surface of such a ceramic substrate. Accordingly, if an undercoat film is provided on such a ceramic substrate by a sputtering process, for example, then the plasma locally loses its stability or consistency due to the non-uniform surface state of the substrate. As a result, the structure or composition of the undercoat film to be provided on the substrate would have decreased uniformity in the vicinity of the substrate interface. Or defects might be created near the substrate interface, too.

Such non-uniform structure or composition or those defects in the film can be eliminated by increasing the thickness of the undercoat film. However, if the undercoat film is thin, there remains some non-uniformity in structure or composition or defects in the film. Accordingly, portions with a different structure or composition or with defects would have decreased dielectric breakdown strength. As a result, the overall undercoat film could have decreased electrical insulation property.

Also, when observing a cross section of a conventional thin-film magnetic head substrate, the present inventors discovered that an Al—Ti—O compound layer with a thickness of about 0.1 μm was produced above the interface between the AlTiC base and the undercoat film of an aluminum oxide. The Al—Ti—O compound is an electrical conductor with a volume resistivity of about $1 \times 10^{-4} \Omega \cdot cm$ to about $1 \times 10^4 \Omega \cdot cm$. Accordingly, when the Al—Ti—O compound layer is produced, the actual thickness of the undercoat film should decrease by thickness of the Al—Ti—O compound layer from the apparent thickness of the undercoat film. That is to say, the thickness of the undercoat film decreases due to the conductive layer produced.

Thus, by making the surface of the base, on which the undercoat film is going to be deposited, uniform enough to prevent any portion of the aluminum oxide deposited as the undercoat film from turning into an electrically conductive degraded layer of an Al—Ti—O compound, for example, a thin-film magnetic head substrate with high electrical insulation property can be obtained.

Figure 1:
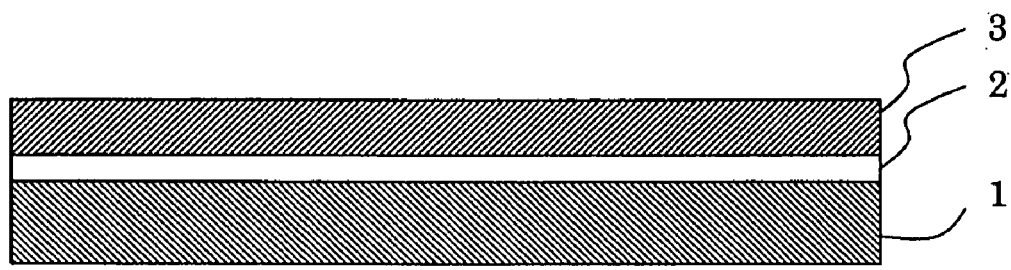
FIG. 1 is a cross-sectional view illustrating the structure of a thin-film magnetic head substrate according to a preferred embodiment of the present invention.
Figure 7A:
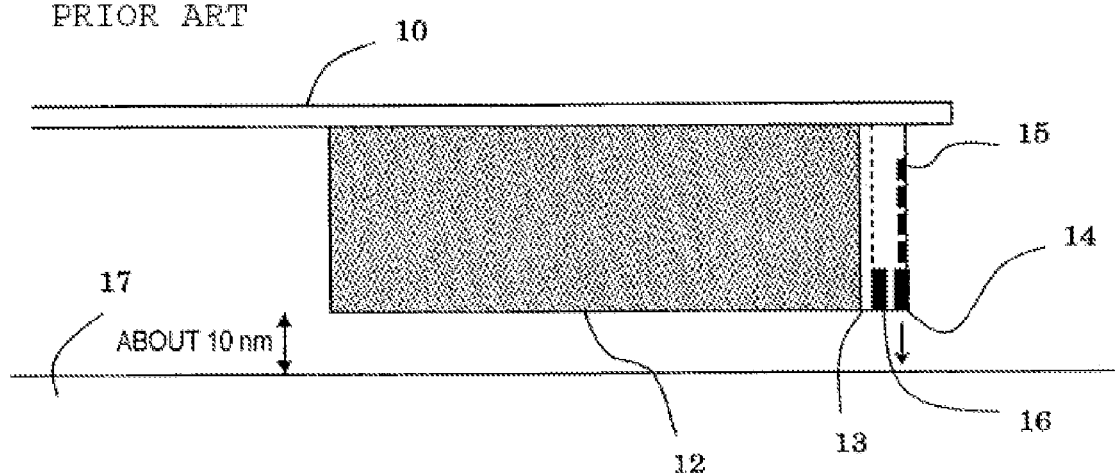
FIG. 7A is a cross-sectional view schematically illustrating a conventional thin-film magnetic head slider.
Figure 7B:
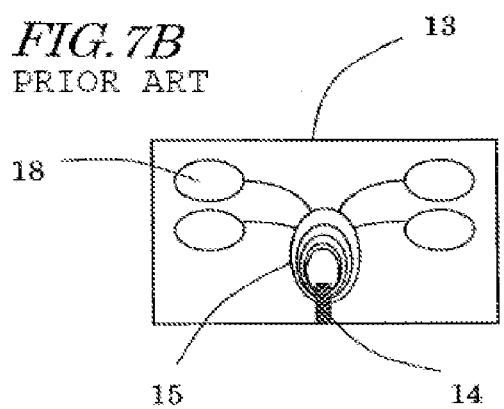
FIG. 7B is a plan view schematically illustrating the configuration of the write head shown in FIG. 7A.

Hereinafter, a thin-film magnetic head substrate according to a specific preferred embodiment of the present invention will be described. FIG. 1 illustrates a wafer for use to make a thin-film magnetic head substrate according to a preferred embodiment of the present invention. As shown in FIG. 1, the wafer preferably includes a ceramic base 1, an undercoat film 3, and an intermediate layer 2, which is sandwiched between the ceramic base 1 and the undercoat film 3. It should be noted that a chip, obtained by cutting the wafer shown in FIG. 1 perpendicularly to the ceramic base 1, is preferably used as the thin-film magnetic head substrate, including the base 12 and the undercoat film 13, as shown in FIG. 7A.

To prevent the electrostatic breakdown, the ceramic material of the ceramic base 1 preferably has a volume resistivity that is within a range in which almost no static electricity is stored. More specifically, the ceramic material preferably has a volume resistivity of at most about $1 \times 10^9 \Omega \cdot cm$, which is the highest allowable volume resistivity of so-called "semi-conductive materials". On the other hand, the lower the volume resistivity of the ceramic material, the less likely it is that the static electricity is stored there. However, if the volume resistivity of the ceramic material is too low, then a metallic bonding property will dominate the ceramic material. In that case, the ceramic material should exhibit a high cutting resistance and a poor tribology property while being subjected to a cutting process. For that reason, the volume resistivity of the ceramic material is preferably at least about $1 \times 10^{-5} \Omega \cdot cm$. That is to say, the ceramic base preferably has a volume resistivity of about $1 \times 10^{-5} \Omega \cdot cm$ to about $1 \times 10^9 \Omega \cdot cm$.

The ceramic base 1 is also preferably made of a material having high thermal conductivity. To prevent the heat which is generated from the read and write heads from being stored in the heads but to allow the heat to diffuse efficiently into the ceramic base 1 by way of the undercoat film 3 and intermediate layer 2, the ceramic material preferably has a thermal conductivity of at least about 5 W/mK, more preferably at least about 15 W/mK.

Also, if the ceramic base 1 has a high surface roughness, then the surface of the undercoat film 3 will not be smooth enough, either. In that case, the surface roughness of the undercoat film 3 cannot be reduced to a predetermined range to be described later even if the undercoat film 3 is subjected to a polishing process. Accordingly, before the intermediate layer 2 is deposited thereon, the ceramic base 1 preferably has an average surface roughness Ra of at most about 2.5 nm.

A ceramic material having any of various compositions may be used for the ceramic base 1 as long as the ceramic material exhibits those preferred properties. Among other things, the present invention can be significantly effective by using a composite ceramic base including two or more compounds with mutually different electrical conductivities or insulation properties. For example, the ceramic base 1 may include about 24 mol % to about 75 mol % of $\alpha$-$Al_2O_3$ and the balance thereof may include a metal carbide or a metal carbonate nitride and about 2 mol % or less of a sintering assistant. A base material having such a composition has only a few openings or pores and can be finished so as to have a very low surface roughness, and therefore, can be used effectively as a base material for a thin-film magnetic head slider. More specifically, a base made of a ceramic material including about 24 mol % to about 75 mol % of $\alpha$-$Al_2O_3$, about 24 mol % to about 75 mol % of TiC and about 2 mol % or less of a sintering assistant, can be used particularly effectively in a thin-film magnetic head slider.

Examples of other preferred ceramic bases that are applicable for use in a thin-film magnetic head slider according to a preferred embodiment of the present invention include a base made of an SiC—$Al_2O_3$ ceramic material as disclosed in Japanese Patent No. 1899891 or U.S. Pat. No. 4,796,127, a base made of a $ZrO_2$—$Al_2O_3$ ceramic material as disclosed in Japanese Patent No. 1659501 or U.S. Pat. No. 4,814,915, and a base made of a $ZrO_2$—SiC material, which is well known as a typical conductive ceramic material. However, a material that is hard to process into a desired shape and exhibits a poor tribology property (e.g., SiN) is not suitable for the ceramic base 1.

As described above, the intermediate layer 2 is preferably provided on the ceramic base 1 so as to flatten the surface of the base on which the undercoat film 3 will be deposited and to prevent any portion of the undercoat film 3 from reacting to the ceramic base 1 and turning into an electrically conductive compound. Thus, to make the entire surface of the ceramic base 1 uniform, the intermediate layer 2 preferably has the same composition overall and preferably covers the surface of the ceramic base 1 entirely. Also, the intermediate layer 2 is preferably made of a material with good thermal conductivity and adhesiveness.

Specifically, if the surface roughness of the ceramic base 1 and the conditions for forming the intermediate layer are appropriately selected, then the entire surface of the ceramic base 1 can be coated uniformly with the intermediate layer with a thickness of 1 nm or more. If the thickness of the intermediate layer 2 is increased to 3 nm or more, the entire surface of the ceramic base 1 can be coated uniformly with more certainty. However, if the intermediate layer 2 is less 1 nm thick, then it is difficult to cover the entire surface of the ceramic base 1 uniformly with such a thin intermediate layer 2 and some portions of the surface of the ceramic base 1 are likely to be exposed unintentionally. In that case, when the undercoat film 3 is formed by a sputtering process, the plasma could become non-uniform in the vicinity of the intermediate layer 2 on which the undercoat film 3 is going to be deposited, thus possibly causing the same old problems.

As long as the surface of the base on which the undercoat film 3 is going to be deposited can be flattened, the effects of the present invention are still achievable no matter how thick the intermediate layer 2 may be. Nevertheless, if the thickness of the intermediate layer 2 exceeded 100 nm, then it would take an excessively long time to form the intermediate layer 2, thus dropping the productivity of thin-film magnetic head substrates. Also, the thickness of the intermediate layer 2 should not exceed 1 µm. The reason is as follows. Specifically, when the slider is complete, a portion of that thick intermediate layer 2, exposed on the ABS plane, will have an increased cross-sectional area. Then, big level differences are easily produced on the ABS plane due to a difference in thermal expansion coefficient or hardness among the ceramic base 1, undercoat film 3 and intermediate layer 2. In view of these considerations, the intermediate layer 2 preferably has a thickness of 1 nm to 1 µm, more preferably 3 nm to 100 nm.

As such an intermediate layer 2 having these features, a metal or silicon film or layer is preferably used. Considering their good adhesiveness and thermal conductivity, the material of the intermediate layer 2 is preferably selected from the group consisting of Cu, Cr, Si, alloys including Cu, alloys including Cr, and compounds including Si. Examples of other preferred metals for the intermediate layer 2 include Ni, Au, Ag, Fe, Co and Ti. The intermediate layer 2 may also be made of a non-metallic compound such as SiC or $SiO_2$. The present inventors discovered and confirmed via experiments that even when the intermediate layer 2 was made of Ti, no electrically conductive degraded layer was produced in the undercoat film 3. This is believed to be because Ti atoms in the AlTiC base and Ti atoms in the Ti film should have reacted differently to the aluminum oxide.

Aluminum oxides generally exhibit poor adhesiveness, and therefore, the intermediate layer 2 should not be made of any aluminum oxide. An Al—Ti—O compound is not preferable for the intermediate layer 2, either. For example, neither an Al—Ti—O compound layer, produced as a degraded layer in the undercoat film of an aluminum oxide, nor an Al—Ti—O surface modified layer for use to increase the adhesiveness in Japanese Laid-Open Publication No. 2000-260009 is preferred as the intermediate layer 2. This is because each of these Al—Ti—O compounds, including titanium or a titanium oxide, could produce an electrically conductive degraded layer in the undercoat film 3 when diffusing into or entering accidentally the undercoat film 3.

The intermediate layer 2 is preferably formed by a sputtering process with no bias voltage applied. As used herein, the "bias voltage for a sputtering process" means a voltage to be applied to make ions and particles within a chamber collide against a base, on which a film is going to be deposited, while accelerating those ions and particles to such a degree as to cause a sputtering reaction on the surface of the base. Accordingly, the condition of "applying no bias voltage" may refer to a situation where a voltage is applied so as to accelerate the ions or particles only to prevent constituent atoms or particles, ejected out of the base, from being substantially included in the film that is going to be deposited on the base.

If the bias voltage were applied to form the intermediate layer 2, those ions or particles, accelerated by the sputtering bias voltage, would collide against the base. Then, the constituent particles or atoms would be ejected out of the ceramic base 1 and deposited on a target. Those deposited particles or atoms, along with the constituent material of the target, would be going to form the intermediate layer 2 through this sputtering action. In that case, the constituent particles or atoms of the ceramic base 1 should be included in the intermediate layer 2. Then, if the material of the ceramic base 1 included something to react to the material of the undercoat film 3 to possibly produce an electrically conductive degraded layer, the electrically conductive degraded layer could be produced in the undercoat film 3 even when the intermediate layer 2 includes no such material.

The undercoat film 3 is preferably made of an amorphous aluminum oxide. To exhibit an electrical insulation property represented by predetermined dielectric breakdown strength or more, the undercoat film 3 preferably has a thickness of at least 10 nm. Also, in order to conduct the heat, generated in the read or write head on the undercoat film 3, toward the ceramic base 1 quickly, the undercoat film 3 preferably has a thickness of at most 1 µm. As will be described later for specific examples of preferred embodiments of the present invention, significant effects are achieved by providing the intermediate layer 2 if the undercoat film 3 has a thickness of 0.4 µm or less.

In general, an aluminum oxide does not have good adhesiveness. For that reason, the undercoat film 3 is preferably formed by a sputtering process with a bias voltage applied. As described above, in this preferred embodiment, the intermediate layer 2 is preferably made of such a material that the constituent atoms of the intermediate layer 2 will not produce any electrically conductive degraded layer in the undercoat film 3 even when diffusing into, or entering accidentally, the undercoat film 3. That is why no electrically conductive degraded layer would be produced in the undercoat film 3 even if the constituent atoms of the intermediate layer 2 diffused toward, or entered accidentally, the undercoat film 3 as a result of the sputtering process with a bias voltage applied.

In the thin film magnetic head substrate having such a structure, the undercoat film to be provided has uniform composition and structure, and no electrically conductive degraded layer is produced in the undercoat film. Accordingly, the undercoat film is relatively thin but can still exhibit excellent electrical insulation property. Thus, the thin film magnetic head substrate can have its thermal conductivity improved by reducing the thickness of the undercoat film and yet maintain excellent electrical insulation property. Among other things, a thin film magnetic head substrate according to a preferred embodiment of the present invention, including a metal layer as its intermediate layer, is totally novel and unexpected from the prior art in that the substrate uses the metal layer to increase its electrical insulation property.

Embodiment 1

Hereinafter, a specific example of preferred embodiments of the present invention will be described. In the following specific example, a thin film magnetic head substrate was actually manufactured and its electrical insulation property was measured.

On an AlTiC base 1 including 70 vol % of $\alpha$-$Al_2O_3$ and 30 vol % of TiC, an intermediate layer 2 including Cr, Cu or Si was deposited to any of various thicknesses by a sputtering process with no bias voltage applied. Thereafter, an undercoat film 3 of an aluminum oxide was deposited thereon to any of various thicknesses by a sputtering process with an $Al_2O_3$ target used and with a bias voltage applied thereto.

As a comparative example, another sample was prepared under the same conditions except that no intermediate layer 2 was provided.

To evaluate the properties of the samples prepared, the dielectric breakdown voltages of these samples were measured. An AlCu film was deposited to a thickness of 1 μm on the undercoat film 3 of each sample and then a resist pattern, including 240 μm square pattern elements at an interval of 240 μm, was defined on the AlCu film. Thereafter, the AlCu film, undercoat film 3 and intermediate layer 2 were selectively wet-etched away with the resist pattern used as a mask. Then, the resist pattern was stripped.

Figure 2:
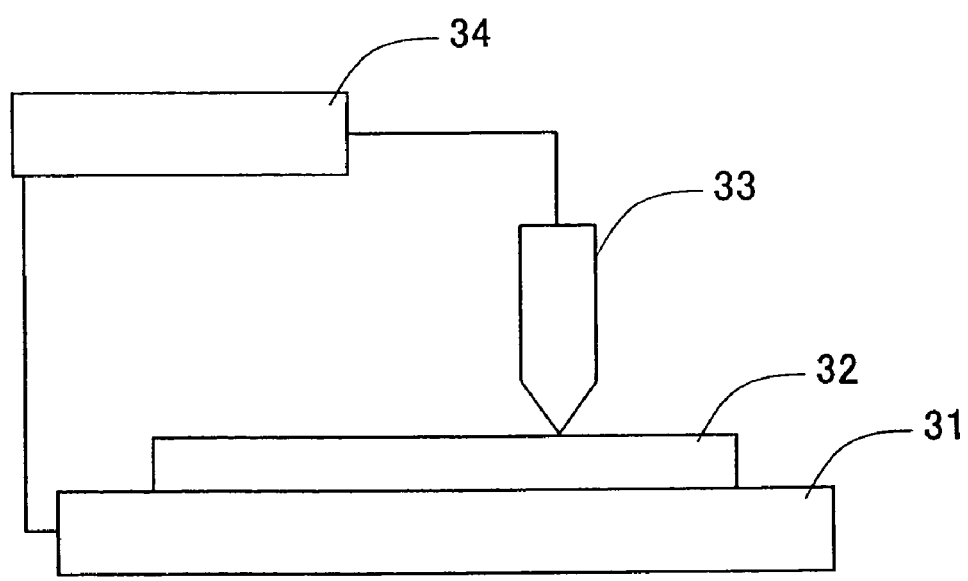
FIG. 2 is a schematic representation illustrating a configuration for an apparatus for measuring the dielectric breakdown voltage.

A portion of the undercoat film 3, where the dielectric breakdown voltage will be measured, had its thickness obtained by Nanospec 6100 produced by Nanometrix, Inc. Thereafter, as shown in FIG. 2, each sample 32 was adsorbed onto a stage 31, which was connected to one terminal of a micro current meter 34 (e.g., R8340 produced by Advantest Inc., Japan), while a probe 33, which was connected to the other terminal of the micro current meter 34, was brought into contact with the AlCu pattern. Then, the amount of current flowing was measured a number of times with the applied voltage increased from 0 V by 100 V each time. When the amount of current flowing reached 100 μA, the sample was regarded as having caused a dielectric breakdown and the voltage applied at that point in time was regarded as its dielectric breakdown voltage.

Figure 3:
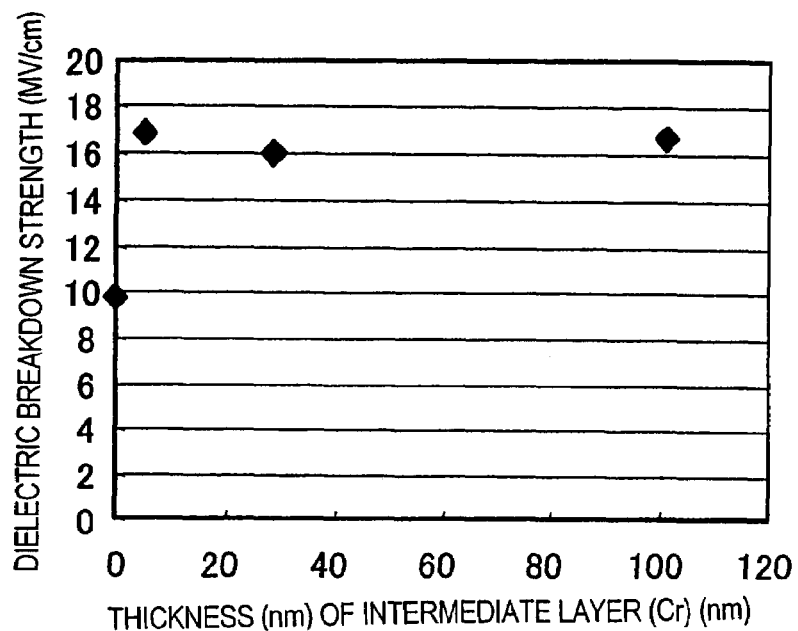
FIG. 3 is a graph showing a relationship between the thickness of an intermediate layer and the dielectric breakdown strength.

FIG. 3 is a graph showing how the dielectric breakdown strength changed with the thickness of the intermediate layer 2 of Cr. In this case, the undercoat film 3 had a thickness of 0.2 μm and the dielectric breakdown strength shown in FIG. 3 was obtained by dividing the dielectric breakdown voltage thereof by the thickness of the undercoat film 3. As shown in FIG. 3, when no intermediate layer 2 was provided (i.e., when its thickness was 0 nm), the dielectric breakdown strength was 10 MV/cm. However, when an intermediate layer 2 with a thickness of 3 nm was provided, the dielectric breakdown strength increased to 17 MV/cm. Also, if the thickness of the intermediate layer 2 was 3 nm or more, then the dielectric breakdown strength was substantially constant. Thus, it can be seen that as long as the intermediate layer 2 covered the surface of the ceramic base 1 almost completely, the dielectric breakdown strength could be increased no matter how thick the intermediate layer 2 was.

Figure 4:
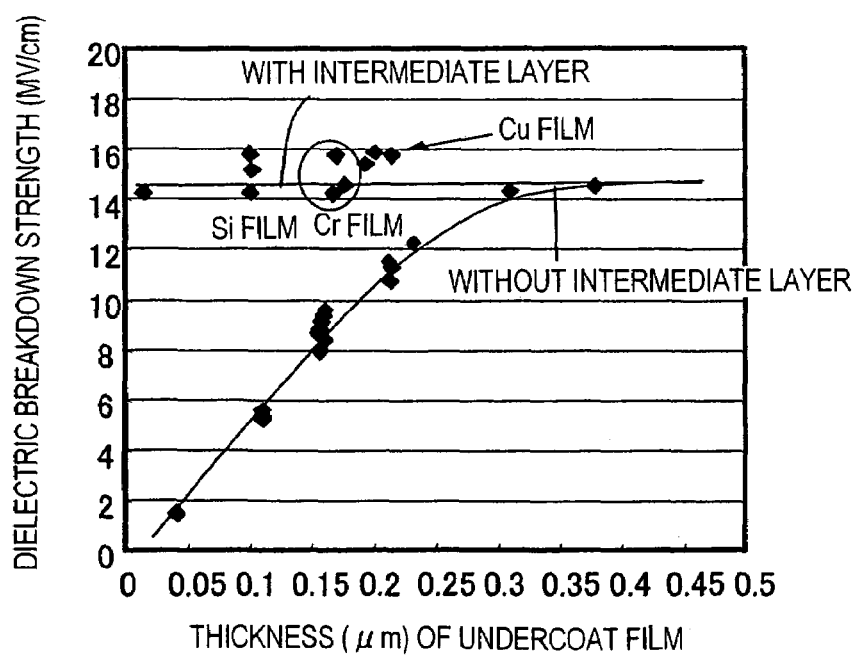
FIG. 4 is a graph showing relationships between the thickness of an undercoat film and the dielectric breakdown strength.

FIG. 4 is a graph showing how the dielectric breakdown strength changed with the thickness of the undercoat film. In this case, the intermediate layer was a metal film of Si, Cr or Cu with a thickness of 30 nm and the dielectric breakdown strength shown in FIG. 4 was obtained by dividing the dielectric breakdown voltage by the thickness of the undercoat film 3. FIG. 4 also shows how the dielectric breakdown strength changed when the undercoat film was directly deposited on the base with no intermediate layer provided between them. As shown in FIG. 4, if no intermediate layer was provided and if the undercoat film had a thickness of 0.3 μm or less, then the dielectric breakdown strength decreased. On the other hand, if the intermediate layer was provided, a dielectric breakdown strength of about 14.5 MV/cm was always obtained no matter how thick the undercoat film was. That is to say, when the intermediate layer was provided, the dielectric breakdown voltage of the undercoat film per unit thickness was substantially constant. Thus, the dielectric breakdown strength of the undercoat film could be estimated from its thickness.

However, when the thickness of the undercoat film reached about 0.4 μm, the dielectric breakdown strength of the undercoat film with the intermediate layer became equal to that of the undercoat film with no intermediate layer.

This is because in the conventional structure, if the undercoat film 3 becomes sufficiently thick, even an electrically conductive Al—Ti—O compound produced there does not affect the dielectric breakdown voltage significantly. Consequently, if the undercoat film 3 has a thickness of 10 nm to 0.4 μm, the electrical insulation property can be improved significantly by providing the intermediate layer 2.

Figure 5:
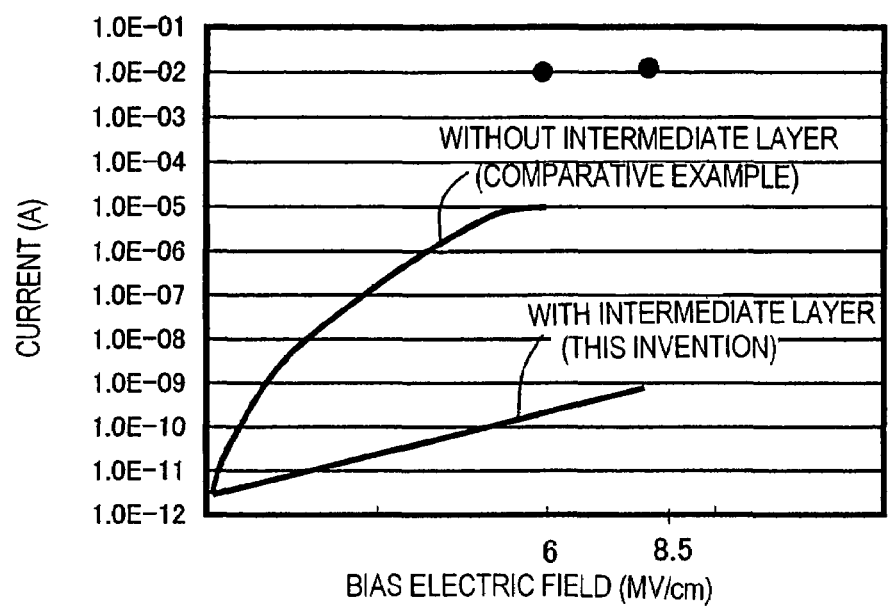
FIG. 5 is a graph showing relationships between the bias electric field and the leakage current.

FIG. 5 is a graph showing how the amount of leakage current increases with the voltage applied to the undercoat film 3 with a thickness of 0.15 μm. In FIG. 5, the applied voltage is represented by the intensity of a bias electric field divided by the thickness of the undercoat film 3. As shown in FIG. 5, in the sample including the intermediate layer 2 according to a preferred embodiment of the present invention, as the intensity of the bias electric field increased, the amount of the leakage current increased monotonically. And when the bias electric field reached an intensity of about 8.5 MV/cm, dielectric breakdown occurred. On the other hand, in the sample including no intermediate layer 2 according to a comparative example, as the intensity of the bias electric field increased, the amount of the leakage current increased steeply. And when the bias electric field reached an intensity of about 6 MV/cm, dielectric breakdown occurred. The amount of leakage current flowing just before the dielectric breakdown occurred was about 1 mA in the sample including the intermediate layer 2 according to the preferred embodiment of the present invention, but was about 10 mA in the sample including no intermediate layer 2 according to the comparative example. Thus, in the sample including no intermediate layer 2 according to the comparative example, even before the dielectric breakdown actually happened, the amount of the leakage current had already increased significantly and the electrical insulation property had already deteriorated. On the other hand, the sample including the intermediate layer 2 according to the preferred embodiment of the present invention maintained good electrical insulation property until the dielectric breakdown finally happened.

Embodiment 2

Hereinafter, a specific preferred embodiment of a thin-film magnetic head slider according to the present invention will be described with reference to the accompanying drawings.

Figure 6:
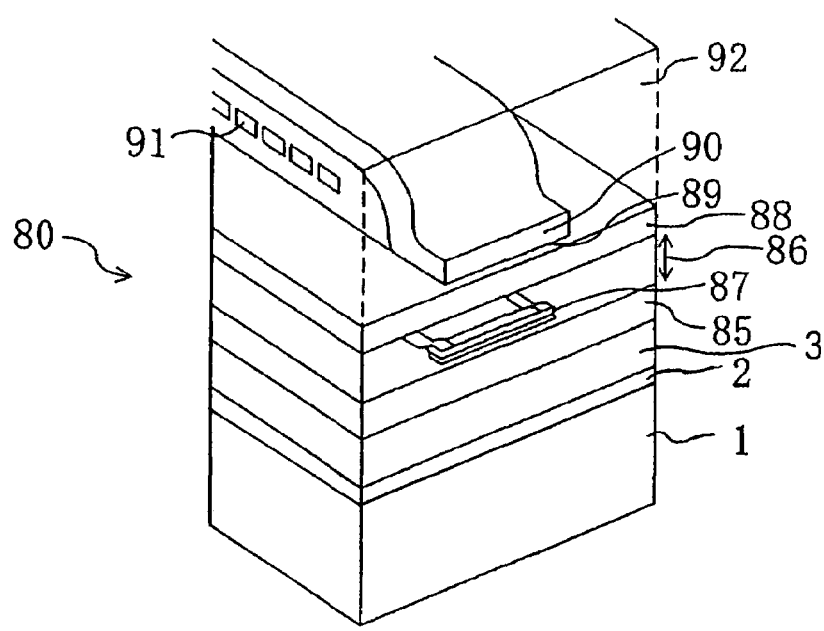
FIG. 6 is a perspective view illustrating main portions of a thin-film magnetic head slider according to a preferred embodiment of the present invention.

FIG. 6 is a perspective view illustrating main portions of a thin-film magnetic head slider 80. Although no gimbal for the thin-film magnetic head slider 80 is shown in FIG. 6, the main portions shown in FIG. 6 are actually attached to a gimbal similar to that shown in FIG. 7A.

As shown in FIG. 6, the thin-film magnetic head slider 80 preferably includes a ceramic base 1, an intermediate layer 2 deposited on the ceramic base 1, an undercoat film 3 deposited on the intermediate layer 2, and a shield film 85 deposited on the undercoat film 3. In this preferred embodiment, a Cr film with a thickness of 10 nm is deposited as the intermediate layer 2 and an aluminum oxide is deposited as the undercoat film 3 to a thickness of 1 μm.

A gap 86 of about 0.4 μm is preferably provided over the shield film 85. A GMR read head 87 is preferably embedded in the gap 86 and may have a known structure including an electrode and a GMR film (not shown). The gap 86 may be an insulating film of alumina, for example, which has been deposited on the shield film 85 so as to cover the GMR read head 87. The GMR read head 87 may have a thickness of about 0.1 μm, for example. It should be noted that the magnetic element (i.e., read head) to be provided on the shield film 85 is not limited to the GMR element but may also be any other type of magnetic element such as an MR or TMR element.

Another shield film 88 is preferably deposited on the insulating film that defines as the gap 86. These two shield films 85 and 88 are preferably made of a soft magnetic material such as a permalloy, and may also function as magnetic shield films. A top pole 90 (with a thickness of about 2 μm to about 3 μm) is preferably provided over the shield film 88 with a write gap 89 of about 0.4 μm to about 0.6 μm provided between them. A coil pattern 91, formed by patterning a Cu film with a thickness of about 5 μm, is preferably provided between the shield film 88 and the top pole 90. The coil pattern 91 is preferably coated with an organic insulating film. The shield film 88 (functioning as a bottom pole), coil pattern 91 and top pole 90 together define a write head portion. When a current is supplied through the coil pattern 91, a magnetic field is generated near the write gap 89, thereby writing (i.e., recording) data onto a magnetic storage medium (not shown). The write head portion is preferably covered with an overcoat film 92 with a thickness of about 40 μm, for example.

The thin-film magnetic head slider 80 may be fabricated in the following manner, for example. Specifically, first, a thin-film magnetic head wafer is preferably prepared by depositing an intermediate layer 2 and an undercoat film 3 in this order on a ceramic base 1. Next, the multilayer structure, including the shield film 85 at the bottom and the overcoat film 92 at the top, is preferably formed on the wafer by normal thin film deposition and photolithographic processes. Thereafter, the wafer is preferably divided into multiple chips so as to obtain the head portions as shown in FIG. 7A. Subsequently, each of those head portions is subjected to an air bearing surface (ABS) process and then attached to a gimbal, thereby completing a thin-film magnetic head slider.

According to various preferred embodiments of the present invention described above, the intermediate layer 2 is preferably provided. Accordingly, even if the thermal conductivity is increased by reducing the thickness of the undercoat film 3 to about 1 μm, excellent electrical insulation property can still be maintained. Thus, thanks to, the resultant good heat dissipation ability, the TPTR phenomenon, which would often be caused due to the heat generated from a write head, can be minimized and the electrostatic or dielectric breakdown of the thin-film magnetic head slider can be prevented as well. As a result, the thin-film magnetic head slider can have an even smaller size.

A thin-film magnetic head substrate according to any of various preferred embodiments of the present invention described above exhibits excellent thermal conductivity and electrical insulation property, and therefore, can be used effectively to make a highly reliable thin-film magnetic head slider or hard disk drive with huge storage capacity.

This application is based on Japanese Patent Applications No. 2003-280675 filed on Jul. 28, 2003 and No. 2004-096323 filed on Mar. 29, 2004, the entire contents of which are hereby incorporated by reference.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A thin-film magnetic head substrate comprising:
   a ceramic base;
   an undercoat film of an aluminum oxide; and
   an intermediate layer, which is sandwiched between the ceramic base and the undercoat film and which is made of a material other than the aluminum oxide and a material other than an Al—Ti—O compound; wherein
   the intermediate layer is metal or a material consisting of Si; and
   the undercoat film has a thickness of 10 nm to 0.4 μm.

2. The thin-film magnetic head substrate of claim 1, wherein the intermediate layer has a thickness of 1 nm to 1 μm.

3. The thin-film magnetic head substrate of claim 1, wherein the intermediate layer is made of a material selected from the group consisting of Cu, Cr, alloys including Cu, and alloys including Cr.

4. The thin-film magnetic head substrate of claim 1, wherein the ceramic base is made of an alumina-based ceramic material including 24 mol % to 75 mol % of $\alpha$-$Al_2O_3$ and at most 2 mol % of an additive.

5. The thin-film magnetic head substrate of claim 4, wherein the ceramic base further includes a carbide or nitride carbonate of a metal.

6. A thin-film magnetic head slider comprising:
   a thin-film magnetic head substrate including:
      a ceramic base;
      an undercoat film of an aluminum oxide; and
      an intermediate layer, which is sandwiched between the ceramic base and the undercoat film and which is made of a material other than the aluminum oxide and a material other than an Al—Ti—O compound; and
   a read head and a write head, which are supported on the thin-film magnetic head substrate; wherein
   the intermediate layer is metal or a material consisting of Si; and
   the undercoat film has a thickness of 10 nm to 0.4 μm.

7. A hard disk drive comprising:
   a thin-film magnetic head slider including:
      a thin-film magnetic head substrate including:
         a ceramic base;
         an undercoat film of an aluminum oxide; and
         an intermediate layer, which is sandwiched between the ceramic base and the undercoat film and which is made of a material other than the aluminum oxide and a material other than an Al—Ti—O compound; and
      a read head and a write head, which are supported on the thin-film magnetic head substrate; wherein
   the intermediate layer is metal or a material consisting of Si; and
   the undercoat film has a thickness of 10 nm to 0.4 μm.

8. A thin-film magnetic head substrate comprising:
a ceramic base;
an undercoat film of an aluminum oxide; and
an intermediate layer, which is sandwiched between the ceramic base and the undercoat film and which is made of a material other than the aluminum oxide and a material other than an Al—Ti—O compound; wherein
the intermediate layer is metal or a material consisting of Si;
the undercoat film has a thickness of 10 nm to 0.4 µm; and
the ceramic base has a volume resistivity of about $1\times10^{-5}$ Ω·cm to about $1\times10^{9}$ Ω·cm.

* * * * *